United States Patent
Arai et al.

(10) Patent No.: US 12,460,167 B2
(45) Date of Patent: Nov. 4, 2025

(54) SCAFFOLD MATERIAL FOR CELL CULTURE AND CELL CULTURE CONTAINER

(71) Applicant: SEKISUI CHEMICAL CO., LTD., Osaka (JP)

(72) Inventors: Yuuhei Arai, Osaka (JP); Nobuhiko Inui, Saitama (JP); Satoshi Haneda, Osaka (JP); Hiroki Iguchi, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 992 days.

(21) Appl. No.: 17/612,451

(22) PCT Filed: Jul. 31, 2020

(86) PCT No.: PCT/JP2020/029452
§ 371 (c)(1),
(2) Date: Nov. 18, 2021

(87) PCT Pub. No.: WO2021/024943
PCT Pub. Date: Feb. 11, 2021

(65) Prior Publication Data
US 2022/0235307 A1    Jul. 28, 2022

(30) Foreign Application Priority Data
Aug. 2, 2019 (JP) ................. 2019-143062

(51) Int. Cl.
*C12M 1/12* (2006.01)
(52) U.S. Cl.
CPC ................. *C12M 25/14* (2013.01)

(58) Field of Classification Search
CPC ............................ C12M 23/20; C12M 25/14
See application file for complete search history.

(56) References Cited

U.S. PATENT DOCUMENTS

2006/0241245 A1   10/2006   Cote
2011/0104732 A1   5/2011   Lucic et al.
(Continued)

FOREIGN PATENT DOCUMENTS

CN          1856483         11/2006
CN         107429210        12/2017
(Continued)

OTHER PUBLICATIONS

International Search Report issued Sep. 24, 2020 in International (PCT) Application No. PCT/JP2020/029452.
(Continued)

*Primary Examiner* — Jonathan M Hurst
(74) *Attorney, Agent, or Firm* — Wenderoth, Lind & Ponack, L.L.P.

(57) ABSTRACT

Provided is a cell culture scaffold capable of allowing cell masses to be formed easily and efficiently. A cell culture scaffold according to the present invention includes a substrate; and a protrusion formed by patterning in a pattern of a dot or a line on the substrate, wherein the protrusion contains a synthetic resin, the synthetic resin contains at least a polyvinyl alcohol derivative or a poly(meth)acrylic resin, the protrusion has cell adhesion, and a portion of the protrusion located at the protrusion center position in plan view has an average height of 10 nm or more and 10 μm or less.

10 Claims, 5 Drawing Sheets

Specification includes a Sequence Listing.

(56) References Cited

U.S. PATENT DOCUMENTS

| | | |
|---|---|---|
| 2011/0224392 A1 | 9/2011 | Cote |
| 2013/0203159 A1 | 8/2013 | Itoh et al. |
| 2014/0273053 A1 | 9/2014 | Lee et al. |
| 2015/0032223 A1 | 1/2015 | Miyagawa et al. |
| 2015/0140652 A1* | 5/2015 | Sasai .................. C12M 25/06 435/366 |
| 2017/0166853 A1 | 6/2017 | Ekeroth |
| 2017/0342363 A1 | 11/2017 | Fang et al. |
| 2018/0086864 A1 | 3/2018 | Sunaga et al. |
| 2018/0355296 A1 | 12/2018 | Nakayama et al. |
| 2019/0322969 A1 | 10/2019 | Fang et al. |
| 2020/0362289 A1 | 11/2020 | Haneda et al. |
| 2020/0370009 A1 | 11/2020 | Haneda et al. |
| 2020/0399576 A1 | 12/2020 | Haneda et al. |
| 2020/0407672 A1 | 12/2020 | Haneda et al. |
| 2021/0071147 A1 | 3/2021 | Haneda et al. |
| 2021/0189312 A1 | 6/2021 | Suda et al. |

FOREIGN PATENT DOCUMENTS

| | | |
|---|---|---|
| CN | 107709539 | 2/2018 |
| EP | 2 284 252 | 2/2011 |
| JP | 3139350 | 2/2008 |
| JP | 2015-192640 | 11/2015 |
| JP | 2017-532974 | 11/2017 |
| JP | 2019-41719 | 3/2019 |
| JP | 2019-118345 | 7/2019 |
| WO | 2005/80547 | 9/2005 |
| WO | 2011/052752 | 5/2011 |
| WO | 2012/036011 | 3/2012 |
| WO | 2012/133900 | 10/2012 |
| WO | 2016/069892 | 5/2016 |
| WO | 2017/126589 | 7/2017 |
| WO | 2018/123663 | 7/2018 |
| WO | 2019/131978 | 7/2019 |
| WO | 2019/131981 | 7/2019 |
| WO | 2019/131982 | 7/2019 |

OTHER PUBLICATIONS

Pasqualini, Renata et al., "A Peptide Isolated from Phage Display Libraries is a Structural and Functional Mimic of an RGD-binding Site on Integrins", The Journal of Cell Biology, Sep. 1995, vol. 130, No. 5, pp. 1189-1196.

Nomizu, Motoyoshi, "How many active sites are located on laminin molecule?", Protein, Nucleic Acid and Enzyme, 2000, vol. 45, No. 15, pp. 2475-2482, with English-language translation.

Maeda, Toshinaga et al., "Artificial Cell Adhesive Proteins", Medicina Philosophica, 1990, vol. 9, No. 7, pp. 527-535, with English-language translation.

Maeda, Toshinaga et al., "Cell Adhesion Signal: Especially Focusing on Adhesion Molecule of Extracellular Matrix and Molecular Recognition Mechanism of Receptor thereof", Journal of Osaka Women's and Children's Hospital, 1992, vol. 8, No. 1, pp. 58-66, with English-language translation.

International Preliminary Report on Patentability issued Feb. 8, 2022 in corresponding International (PCT) Patent Application No. PCT/JP2020/029452.

Guizhi Gao et al., "New University Chemistry Experiment vol. II", pp. 124-125, the publisher China Environmental Press.

Office Action issued Nov. 27, 2024 in European Patent Application No. 20 850 118.9.

Extended European Search Report issued Jul. 19, 2023 in corresponding European Patent Application No. 20850118.9.

\* cited by examiner (a)

(b)

SEQUENCE LISTING

<160> NUMBER OF SEQ ID NOS: 15

<210> SEQ ID NO 1
<211> LENGTH: 4
<212> TYPE: PRT
<213> ORGANISM: Artificial Sequence
<220> FEATURE:
<223> OTHER INFORMATION: Cell adhesion peptide

<400> SEQUENCE: 1

Arg Gly Asp Gly
1

<210> SEQ ID NO 2
<211> LENGTH: 4
<212> TYPE: PRT
<213> ORGANISM: Artificial Sequence
<220> FEATURE:
<223> OTHER INFORMATION: Cell adhesion peptide

<400> SEQUENCE: 2

Arg Gly Asp Ala
1

<210> SEQ ID NO 3
<211> LENGTH: 4
<212> TYPE: PRT
<213> ORGANISM: Artificial Sequence
<220> FEATURE:
<223> OTHER INFORMATION: Cell adhesion peptide

<400> SEQUENCE: 3

Arg Gly Asp Val
1

<210> SEQ ID NO 4
<211> LENGTH: 4
<212> TYPE: PRT
<213> ORGANISM: Artificial Sequence
<220> FEATURE:
<223> OTHER INFORMATION: Cell adhesion peptide

<400> SEQUENCE: 4

Arg Gly Asp Ser
1

<210> SEQ ID NO 5
<211> LENGTH: 4
<212> TYPE: PRT
<213> ORGANISM: Artificial Sequence
<220> FEATURE:
<223> OTHER INFORMATION: Cell adhesion peptide

<400> SEQUENCE: 5

Arg Gly Asp Thr
1

<210> SEQ ID NO 6

```
<211> LENGTH: 4
<212> TYPE: PRT
<213> ORGANISM: Artificial Sequence
<220> FEATURE:
<223> OTHER INFORMATION: Cell adhesion peptide

<400> SEQUENCE: 6

Arg Gly Asp Phe
1

<210> SEQ ID NO 7
<211> LENGTH: 4
<212> TYPE: PRT
<213> ORGANISM: Artificial Sequence
<220> FEATURE:
<223> OTHER INFORMATION: Cell adhesion peptide

<400> SEQUENCE: 7

Arg Gly Asp Met
1

<210> SEQ ID NO 8
<211> LENGTH: 4
<212> TYPE: PRT
<213> ORGANISM: Artificial Sequence
<220> FEATURE:
<223> OTHER INFORMATION: Cell adhesion peptide

<400> SEQUENCE: 8

Arg Gly Asp Pro
1

<210> SEQ ID NO 9
<211> LENGTH: 4
<212> TYPE: PRT
<213> ORGANISM: Artificial Sequence
<220> FEATURE:
<223> OTHER INFORMATION: Cell adhesion peptide

<400> SEQUENCE: 9

Arg Gly Asp Asn
1

<210> SEQ ID NO 10
<211> LENGTH: 5
<212> TYPE: PRT
<213> ORGANISM: Artificial Sequence
<220> FEATURE:
<223> OTHER INFORMATION: Cell adhesion peptide

<400> SEQUENCE: 10

Tyr Ile Gly Ser Arg
1               5

<210> SEQ ID NO 11
<211> LENGTH: 5
<212> TYPE: PRT
<213> ORGANISM: Artificial Sequence
<220> FEATURE:
<223> OTHER INFORMATION: Cell adhesion peptide

<400> SEQUENCE: 11

Pro Asp Ser Gly Arg
1               5

<210> SEQ ID NO 12
<211> LENGTH: 4
```

```
<212> TYPE: PRT
<213> ORGANISM: Artificial Sequence
<220> FEATURE:
<223> OTHER INFORMATION: Cell adhesion peptide

<400> SEQUENCE: 12

Arg Glu Asp Val
1

<210> SEQ ID NO 13
<211> LENGTH: 5
<212> TYPE: PRT
<213> ORGANISM: Artificial Sequence
<220> FEATURE:
<223> OTHER INFORMATION: Cell adhesion peptide

<400> SEQUENCE: 13

Ile Asp Ala Pro Ser
1               5

<210> SEQ ID NO 14
<211> LENGTH: 6
<212> TYPE: PRT
<213> ORGANISM: Artificial Sequence
<220> FEATURE:
<223> OTHER INFORMATION: Cell adhesion peptide

<400> SEQUENCE: 14

Lys Gln Ala Gly Asp Val
1               5

<210> SEQ ID NO 15
<211> LENGTH: 5
<212> TYPE: PRT
<213> ORGANISM: Artificial Sequence
<220> FEATURE:
<223> OTHER INFORMATION: Cell adhesion peptide

<400> SEQUENCE: 15

Gly Arg Gly Asp Ser
1               5
```

SCAFFOLD MATERIAL FOR CELL CULTURE AND CELL CULTURE CONTAINER

TECHNICAL FIELD

The present invention relates to a cell culture scaffold used for culturing cells. The present invention also relates to a cell culture container using the cell culture scaffold.

BACKGROUND ART

In recent years, cell medicine and next-generation medical care using stem cells have attracted attention. Among them, human pluripotent stem cells (hPSCs) such as human embryonic stem cells (hESCs) and human induced pluripotent stem cells (hiPSCs), or differentiated cells derived therefrom are expected to be applied to drug discovery and regenerative medicine. In order to achieve such application, it is necessary to safely and reproducibly culture and grow pluripotent stem cells and differentiated cells.

These stem cells, when populations of the stem cells aggregate and adhere, can form cell masses called spheroids. It is considered that spheroids can be cultured or maintained in a state closer to an in vivo three-dimensional structure, and it is known that spheroids exhibit excellent characteristics as compared with normal flat adhesive culture. Actually, spheroids are used for the screening of anticancer agents using cancer cells, and the like.

For example, Patent Document 1 below discloses a cell culture substrate including a culture substrate having a plurality of microwells formed on one culture surface, the cell culture substrate being capable of suppressing migration of spheroids from the microwells and allowing spheroids having a uniform size to be formed, without an excessive increase in the depth of the microwells.

RELATED ART DOCUMENT

Patent Document

Patent Document 1: WO 2018/123663 A

SUMMARY OF THE INVENTION

Problems to be Solved by the Invention

However, the cell culture substrate described in Patent Document 1 has a problem of low cell culture efficiency because the culture surface is a low cell adhesion surface (surface to which cells do not adhere or are difficult to adhere). In addition, it also has a problem that the cell mass is easily peeled off from the culture surface by vibration such as medium replacement, which makes it difficult to control the shape and size of the cell mass.

It is an object of the present invention to provide a cell culture scaffold and a cell culture container that are capable of allowing cell masses to be formed easily and efficiently.

Means for Solving the Problems

A cell culture scaffold according to the present invention includes:
a substrate; and
a protrusion formed by patterning in a pattern of a dot or a line on the substrate,
the protrusion containing a synthetic resin,
the synthetic resin containing at least a polyvinyl alcohol derivative or a poly(meth)acrylic resin,
the protrusion having cell adhesion, and
a portion of the protrusion located at the protrusion center position in plan view having an average height of 10 nm or more and 10 µm or less.

In a specific aspect of the cell culture scaffold according to the present invention, the ratio of a protein adsorption amount of the protrusion with respect to that of a portion where no protrusion is provided (a protein adsorption amount of the protrusion/a protein adsorption amount of the portion where no protrusion is provided) is 2 or more.

In another specific aspect of the cell culture scaffold according to the present invention, the protrusion is formed by patterning in a pattern of a dot on the substrate, and the protrusion has an average bottom area of 0.005 mm$^2$ or more and 5 mm$^2$ or less.

In still another specific aspect of the cell culture scaffold according to the present invention, the protrusion has a wall portion at a peripheral edge part.

In still another specific aspect of the cell culture scaffold according to the present invention, the protrusion has an elastic modulus at 25° C. of 1 GPa or more, the elastic modulus being measured at the protrusion center position in plan view by a nanoindentation method.

In a more specific aspect of the cell culture scaffold according to the present invention, the synthetic resin contains a Brønsted basic group in an amount of 0.2 mol % or more and 20 mol % or less in a constitutional unit.

In a more specific aspect of the cell culture scaffold according to the present invention, the protrusion has a water swelling rate of 50% or less.

In a more specific aspect of the cell culture scaffold according to the present invention, the protrusion has a peptide moiety on a surface thereof.

A cell culture container according to the present invention includes the cell culture scaffold configured according to the present invention in at least a part of a cell culture region.

Effect of the Invention

According to the present invention, it is possible to provide a cell culture scaffold and a cell culture container that are capable of allowing cell masses to be formed easily and efficiently.

MODE(S) FOR CARRYING OUT THE INVENTION

Figure 1:
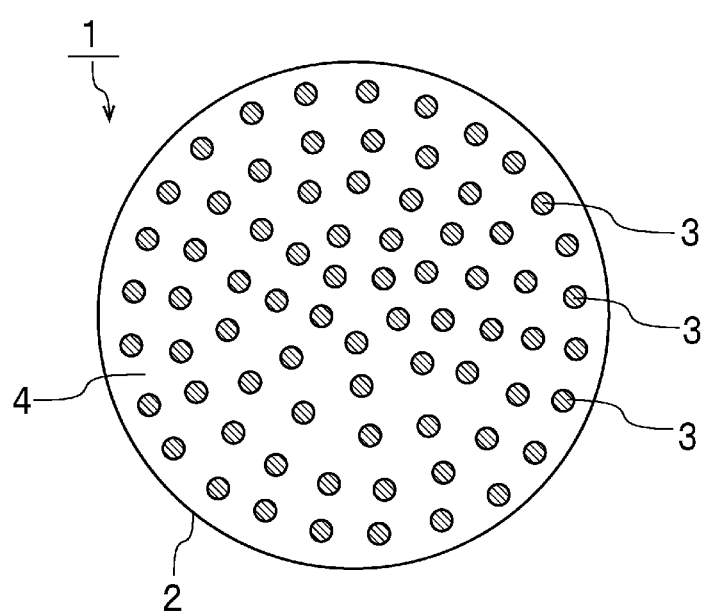
FIG. 1 is a schematic plan view showing a cell culture scaffold according to an embodiment of the present invention.

The following description describes specific embodiments and examples of the present invention while referring to the drawings to clarify the present invention.

A cell culture scaffold of the present invention is a scaffold that includes a substrate and protrusions formed by patterning in a pattern of dots or lines on the substrate. In the cell culture scaffold of the present invention, the protrusions contain a synthetic resin, and the synthetic resin contains at least a polyvinyl alcohol derivative or a poly(meth)acrylic resin. In the cell culture scaffold of the present invention, the protrusions have cell adhesion. In the cell culture scaffold of the present invention, regarding the protrusions, the portions thereof located at the protrusion center positions in plan view have an average height of 10 nm or more and 10 μm or less.

Since the cell culture scaffold of the present invention has the above configuration, cell masses are allowed to be formed easily and efficiently.

With cell culture spaces provided in recesses patterned by a conventional microfabrication technique, cell culture efficiency is low, and it is difficult to form cell masses easily and efficiently. This has been a problem.

The present inventors have focused on protrusions having cell adhesion, and have found that cell masses can be easily and efficiently formed particularly when the average height at a specific position of the protrusions is set to 10 nm or more and 10 μm or less.

Specifically, in the cell culture scaffold of the present invention, the seeded cells gather on the protrusion to form a cell mass. At this time, a cell mass can be formed along the shape of the protrusion. Therefore, the shape and size of the cell mass can be easily controlled by controlling the size and shape of the protrusion.

In addition, in the cell culture scaffold of the present invention, cells can be seeded on both the protrusions and the portion where no protrusion is provided. In particular, of cells seeded in the portion where no protrusion is provided, only cells having good migration properties can be gathered on the protrusions. Therefore, only high-quality cells can be selected, and a high-quality cell masses can be efficiently obtained. In addition, since it is not necessary to selectively seed cells only on the protrusions, cell masses can be easily and efficiently formed.

Therefore, according to the cell culture scaffold of the present invention, high-quality cell masses can be easily and efficiently formed, and the shape and size of the cell masses can be easily controlled.

In addition, in the present invention, a synthetic resin can be used. Therefore, the scaffold has good operability, is inexpensive, has smaller variations among the lots, and has excellent safety, as compared with a scaffold using a natural polymer material.

The following description describes a schematic plan view as an example of a cell culture scaffold including protrusions formed by patterning thereon in a pattern of dots, while referring to FIG. 1.

A cell culture scaffold 1 shown in FIG. 1 includes a substrate 2 and a plurality of protrusions 3 provided on the substrate 2. The plurality of protrusions 3 contain a synthetic resin and have cell adhesion. Further, on the substrate 2, a portion 4 where no protrusion is provided is also provided.

In the present embodiment, the number of cells adhering to the plurality of protrusions 3 per unit area is large, as compared with the number of cells adhering to the portion 4 where no protrusion is provided.

In addition, on the cell culture scaffold 1, the protrusions 3 are formed by patterning in a pattern of dots. The protrusion 3 is substantially circular in planar shape. In the protrusion 3, a portion thereof located at the center of the protrusion 3 in plan view has an average height of 10 nm or more and 10 μm or less.

Therefore, the cell culture scaffold 1 allows high-quality cell masses to be easily and efficiently formed, and can easily control the shape and size of the cell mass.

In the above embodiment, the protrusion is substantially circular in planar shape, but the planar shape of the protrusion may be substantially rectangular or substantially triangular. The shape is not particularly limited. Some or all of the plurality of protrusions may be formed with adjacent dots connected.

The following description further describes details of the cell culture scaffold of the present invention.

[Protrusion]

The cell culture scaffold of the present invention includes protrusions arranged on a substrate. The cell culture scaffold of the present invention includes a substrate, and dot-shaped protrusions or line-shaped protrusions provided on the substrate. The protrusions are formed by patterning in a pattern of dots or lines on the substrate. Since the protrusions are arranged in dots or in lines on the substrate, high-quality cell masses can be more easily and efficiently formed, and the shape and size of the cell masses can be more easily controlled. The protrusions may be formed by patterning in a pattern of dots on the substrate, may be formed by patterning in a pattern of lines on the substrate, or may be formed by patterning in a pattern of dots and lines on the substrate.

From the viewpoint of controlling the shape and size of the cell masses more easily, it is preferable that the protrusions are formed by patterning in a pattern of dots. The cell culture scaffold preferably includes at least protrusions formed by patterning in a pattern of dots.

The number of protrusions may be singular or plural. The number of protrusions can be, for example, 1 to 1500. When the protrusions are formed by patterning in a pattern of dots, the number of protrusions is preferably 1 or more, more preferably 5 or more, and still more preferably 10 or more, as well as preferably 1500 or less, more preferably 1000 or less, and still more preferably 500 or less. When the number of protrusions is the above-described lower limit or more and the above-described upper limit or less, high-quality cell masses can be more easily and efficiently formed, and the shape and size of the cell masses can be more easily controlled. When the protrusions are formed by patterning in a pattern of lines, the number of protrusions may be one, two, or more.

Regarding the protrusions, the portions thereof located at the protrusion center positions in plan view have an average height of 10 nm or more and 10 μm or less. Regarding the protrusions, the portions thereof located at the protrusion center positions in plan view preferably have an average height of 50 nm or more, and more preferably 100 nm or more, as well as preferably 5 μm or less, more preferably 2 μm or less, and still more preferably 1 μm or less. When the average height is within the above range, high-quality cell masses can be more easily and efficiently formed, and the shape and size of the cell masses can be more easily controlled.

The height of the portion located at the protrusion center position in plan view can be measured with a hybrid laser microscope or the like. The average protrusion height of the portions located at the protrusion center positions in plan view is an average value of the heights of the protrusions at the protrusion center positions in plan view. The average protrusion height of the portions located at the protrusion center positions in plan view is an average of heights from the surface (upper surface) of the substrate to the protrusion center positions in plan view. The above-described average height is an average of heights at the center positions of planar shapes of the protrusions when the dot-form protrusions are viewed in plan view. When the planar shape when the dot-form protrusion is viewed in plan view is a circular shape or an elliptical shape, the protrusion center position in plan view means the center of the circle or the ellipse. When the planar shape when the dot-form protrusion is viewed in plan view is a polygonal shape or the like, the protrusion center position in plan view means the center of gravity of the polygon or the like. When the protrusion is in a line form, the average height is an average of heights of the line-form protrusions at the line width center positions. When the protrusion is one in number and is formed by patterning in a pattern of a dot, the average height means a height of the protrusion at the center position thereof in plan view. When the protrusions are less than ten in number and are formed by patterning in a pattern of dots, the average height means an average value of the heights of the protrusions at the center positions thereof in plan view. When the protrusions are ten or more in number and are formed by patterning in a pattern of dots, the average height means an average value of the heights of randomly selected ten of the protrusions at the center positions thereof in plan view. In addition, when the protrusions are formed by patterning in a pattern of lines, the average height means an average value of the heights at randomly selected ten width center positions that are 10 µm or more apart from one another. Note that the center position does not have to be completely the center position, and may be away from the center position within the range of the measurement error, or may be a substantially center position.

When the protrusions are formed by patterning in a pattern of dots, the average protrusion bottom area is preferably 0.005 mm$^2$ or more, more preferably 0.02 mm$^2$ or more, and still more preferably 0.1 mm$^2$ or more, as well as preferably 5 mm$^2$ or less, more preferably 3 mm$^2$ or less, and still more preferably 1.5 mm$^2$ or less. In this case, high-quality cell masses can be more easily and efficiently formed, and the shape and size of the cell masses can be more easily controlled.

When the protrusion is one in number, the average protrusion bottom area means the bottom area of this protrusion. When the protrusions are less than ten in number, the average protrusion bottom area means an average value of the bottom areas of these protrusions. When the protrusions are ten or more in number, the average protrusion bottom area means an average value of the bottom areas of randomly selected ten of these protrusions.

Further, the protrusions may be formed by patterning in a pattern of lines. In this case, the protrusion may be formed in a linear, polygonal, or curved line shape, or may be formed in a circular or spiral shape.

When the protrusions are formed by patterning in a pattern of lines, the average protrusion line width is preferably 50 µm or more, and more preferably 100 µm or more, as well as preferably 1.5 mm or less, and more preferably 0.5 mm or less. In this case, high-quality cell masses can be more easily and efficiently formed, and the shape and size of the cell masses can be more easily controlled.

The protrusions have cell adhesion. In the present invention, the "protrusion having cell adhesion" means that the number of cells adhering to the protrusion per unit area of the protrusion is large, as compared with the portion where no protrusion is provided. Therefore, the protrusions preferably have higher cell adhesion as compared with the substrate.

In the present invention, the ratio of a protein adsorption amount of the protrusions with respect to that of the portion where no protrusion is provided (a protein adsorption amount of the protrusions/a protein adsorption amount of the portion where no protrusion is provided) is preferably 1.5 or more, and more preferably 2 or more, as well as preferably 15 or less, and more preferably 10 or less. In this case, the cell adhesion of the protrusions can be further enhanced, and cell masses can be more easily and efficiently formed.

The protein adsorption amount can be measured, for example, by the following method.

On the cell culture scaffold, 40 µL of FITC-labeled bovine serum albumin (manufactured by Cosmo Bio Co., Ltd.) at 0.1 mg/mL is cast. The cell culture scaffold is allowed to stand at 37° C. for 1 hour, then washed with pure water, and dried in an oven at 45° C. for 1 hour. In addition, for calibration of the amount of adsorbed protein, 1 µL of FITC-labeled bovine serum albumin at 0.005 mg/mL, 0.02 mg/mL, and 0.05 mg/mL, respectively, is dispensed onto polystyrene substrates, and the substrates are dried in an oven at 45° C. for 1 hour. The cell culture scaffold is photographed using a fluorescence microscope, and the fluorescence intensities at the protrusions and the fluorescence intensity at the portion where no protrusion is provided are determined. Based on a linear approximation value of a fluorescence intensity determined by using the polystyrene substrate for calibration curve, conversion into a protein adsorption amount is carried out.

The ratio of the protein adsorption amount can be increased by increasing the content of a cationic functional group such as an amino group or an anionic functional group such as a carboxyl group in the synthetic resin contained in the protrusions.

In the present invention, an elastic modulus at 25° C. of the protrusion at the protrusion center position in plan view, measured by a nanoindentation method, is preferably 1 GPa or more, and more preferably 2 GPa or more, as well as preferably 8 GPa or less, and more preferably 6 GPa or less. When the elastic modulus of the protrusion is within the above range, the cell adhesion of the protrusions can be further enhanced, and cell masses can be more easily and efficiently formed.

The elastic modulus (surface elastic modulus) can be measured using, for example, a nanoindenter (Hysitron, Triboindenter, manufactured by Bruker Corporation). Using a Berkovich (triangular pyramid type) indenter having a tip radius R of several-hundred nanometers as the indenter, the measurement can be performed by single indentation measurement at 25° C. in the atmosphere. The indentation depth can be 50 nm. Note that the center position does not have to be completely the center position, and may be away from the center position within the range of the measurement error, or may be a substantially center position.

The surface elastic modulus can be increased by, for example, a method of increasing the molecular weight of the synthetic resin contained in the protrusions, increasing the degree of crosslinking of the synthetic resin contained in the protrusions, or introducing a crystalline molecular structure into the synthetic resin contained in the protrusions.

In the present invention, the water swelling rate of the protrusions is preferably 50% or less, and more preferably 40% or less. In this case, the cell adhesion of the protrusions can be further enhanced, and cell masses can be more easily and efficiently formed. The lower limit value of the water swelling rate is not particularly limited, but can be set to, for example, 0.5%. The water swelling rate can be measured, for example, as follows.

A substrate and a cell culture scaffold are prepared, and each weight is measured. The weight of the substrate is subtracted from the weight of the cell culture scaffold to determine the "weight of the sample before immersion". Further, the substrate and the cell culture scaffold are immersed in water at 25° C. for 24 hours. After immersion, water attached to the substrate and the cell culture scaffold is removed, and each weight is measured. The weight of the substrate after immersion is subtracted from the weight of the cell culture scaffold after immersion to determine the "weight of the sample after immersion". The water swelling rate=(weight of sample after immersion−weight of sample before immersion)/(weight of sample before immersion)× 100(%) is calculated.

The water swelling rate can be reduced by, for example, increasing the number of hydrophobic functional groups of the synthetic resin contained in the protrusions, reducing the number average molecular weight of the synthetic resin contained in the protrusions, or the like.

The protrusion preferably has a wall portion at a peripheral edge part. In this case, high-quality cell masses can be more easily and efficiently formed, and the shape and size of the cell masses can be more easily controlled. The wall portion is a part of the protrusion. Therefore, when the protrusion has a wall portion, the bottom area, the line width, and the like of the protrusion described above are the bottom area, the line width, and the like of the protrusions including the wall portions.

Figure 2:
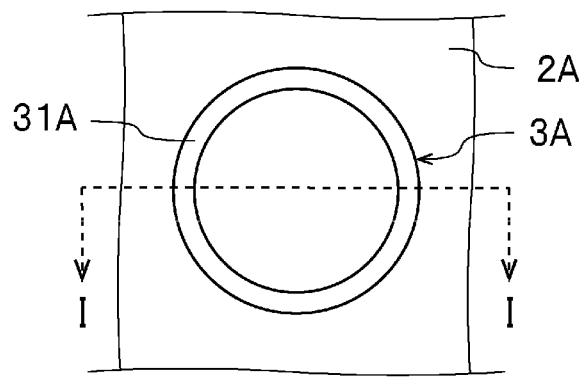
FIG. 2 (a) of FIG. 2 is a schematic plan view showing the periphery of a protrusion having a wall portion at a peripheral edge part in an enlarged manner, and (b) of FIG. 2 is a schematic front cross-sectional view showing the periphery of a protrusion having a wall portion at a peripheral edge part in an enlarged manner.
Figure 2:
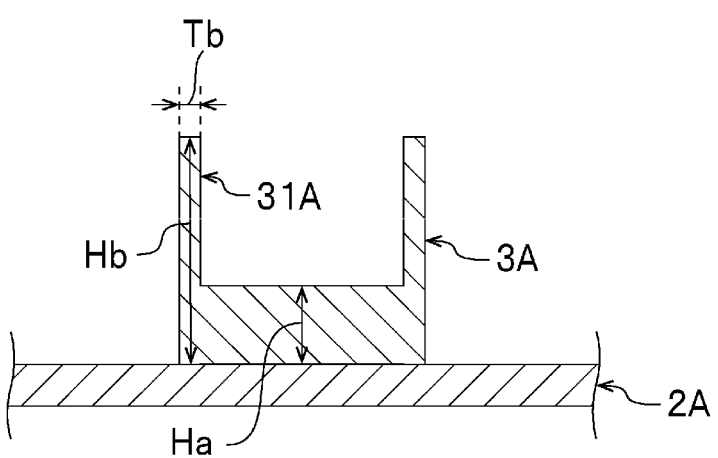

(a) of FIG. 2 is a schematic plan view showing the periphery of a protrusion having a wall portion at a peripheral edge part in an enlarged manner, and (b) of FIG. 2 is a schematic front cross-sectional view showing the periphery of a protrusion having a wall portion at a peripheral edge part in an enlarged manner. (b) of FIG. 2 is a cross-sectional view taken along line I-I in (a) of FIG. 2. In FIG. 2, a portion corresponding to one protrusion is illustrated in an enlarged manner.

In FIG. 2, a protrusion 3A is disposed on the surface of a substrate 2A. The protrusion 3A has a wall portion 31A at a peripheral edge part. The protrusion 3A has the wall portion 31A and a portion not having the wall portion 31A. The protrusion 3A has a circular shape in plan view. The center position of the protrusion 3A in plan view is the center of the circle. The upper surface of the wall portion 31A and the upper surface of the portion not having the wall portion 31A constitute the upper surface of the protrusion 3A. The wall portion 31A has a height Hb higher than a height of the portion not having the wall portion 31A. The height Hb of the wall portion 31A is higher than the height Ha of the protrusion 3A at the center position of the protrusion 3A in plan view. The height Hb of the wall portion is the height of the protrusion at the width-direction center position of the wall portion in plan view, and is the height of the protrusion at the thickness-direction center position of the wall portion. The height Hb of the wall portion is a distance from the surface (upper surface) of the substrate 2A to the width-direction center position of the upper surface of the wall portion 31A. The wall portion 31A of the protrusion 3A has a thickness Tb. The thickness Tb of the wall portion corresponds to the width of the wall portion in plan view. The wall portion 31A and the portion not having the wall portion 31A are formed of the same material. The portion not having the wall portion 31A is surrounded by the wall portion 31A.

The average wall portion height is preferably 100 nm or more, and more preferably 300 nm or more, as well as preferably 50 µm or less, and more preferably 20 µm or less. When the average wall portion height is the above-described lower limit or more and the above-described upper limit or less, high-quality cell masses can be more easily and efficiently formed, and the shape and size of the cell masses can be more easily controlled.

The average thickness of the wall portion is preferably 50 nm or more, and more preferably 100 nm or more, as well as preferably 5 µm or less, and more preferably 1 µm or less. When the average thickness of the wall portion is the above-described lower limit or more and the above-described upper limit or less, high-quality cell masses can be more easily and efficiently formed, and the shape and size of the cell masses can be more easily controlled.

The average wall portion height is preferably higher than the average protrusion height of the portions located at the protrusion center positions in plan view. The ratio of the average wall portion height with respect to the average protrusion height of the portions located at the protrusion center positions in plan view (average wall portion height/ average protrusion height of portions located at protrusion center positions in plan view) is preferably 2 or more, and more preferably 4 or more, as well as preferably 100 or less, and more preferably 50 or less. When the ratio is the above-described lower limit or more and the above-described upper limit or less, high-quality cell masses can be more easily and efficiently formed, and the shape and size of the cell masses can be more easily controlled.

When the protrusion having the wall portion is one in number, the average wall portion height and the average thickness of the wall portion mean the height of the wall portion and the thickness of the wall portion in this protrusion. When the protrusions having the wall portions are less than ten in number, the average wall portion height and the average thickness of the wall portion mean an average value of the heights and an average value of the thicknesses of the wall portions in these protrusions. When the protrusions having the wall portions are ten or more in number, the average wall portion height and the average thickness of the wall portion mean an average value of the heights and an average value of the thicknesses of the wall portions in randomly selected ten of these protrusions.

The method for forming the wall portion is not particularly limited, and examples thereof include a transfer molding method using a mold, a precision machine cutting method, and a chemical etching method.

Examples of a simple method for manufacturing the protrusions having the wall portions include the following methods. First, a solution containing a synthetic resin for forming protrusions is prepared. Next, microdroplets of the solution are placed on the substrate and the solvent is gradually volatilized. When the microdroplets of the solution containing the synthetic resin at a low concentration is gradually dried, protrusions having wall portions at their peripheral edge parts are formed on the substrate.

(Synthetic Resin)

The protrusions of the cell culture scaffold of the present invention contain a synthetic resin (hereinafter, it may be referred to as a synthetic resin X). The synthetic resin X is a synthetic resin included in the protrusion. In the present specification, the "structural unit" refers to a repeat unit of a monomer constituting a synthetic resin. When the synthetic resin has a graft chain, the synthetic resin contains repeat units of a monomer constituting the graft chain.

The synthetic resin X contains, in the constitutional unit, the Brønsted basic group preferably in an amount of 0.2 mol % or more, and more preferably in an amount of 2 mol % or more, as well as preferably in an amount of 30 mol % or less, more preferably in an amount of 20 mol % or less, and further preferably in an amount of 15 mol % or less. In this case, the effect of the present invention can be more effectively exhibited. The Brønsted basic group and the like will be described later.

The synthetic resin X contains at least a polyvinyl alcohol derivative or a poly(meth)acrylic resin. When the synthetic resin X contains a polyvinyl alcohol derivative or a poly(meth)acrylic resin, adhesion with cells can be enhanced, and the swelling of the cell culture scaffold in a liquid medium is further suppressed. The synthetic resin X may contain a polyvinyl alcohol derivative, or may contain a poly(meth)acrylic resin, or alternatively, may contain both a polyvinyl alcohol derivative and a poly(meth)acrylic resin. Regarding each of the polyvinyl alcohol derivative and the poly(meth)acrylic resin, only one kind of the same may be used, or two or more kinds thereof may be used in combination.

The polyvinyl alcohol derivative is preferably a synthetic resin having a polyvinyl acetal skeleton. The poly(meth)acrylic resin is preferably a synthetic resin having a poly(meth)acrylic acid ester skeleton.

<Synthetic Resin Having Polyvinyl Acetal Skeleton>

The protrusions of the cell culture scaffold preferably contain a synthetic resin having a polyvinyl acetal skeleton. The synthetic resin X preferably contains a synthetic resin having a polyvinyl acetal skeleton.

In the present specification, a "synthetic resin having a polyvinyl acetal skeleton" may be described as a "polyvinyl acetal resin X".

The polyvinyl acetal resin X preferably has an acetal group, an acetyl group, and a hydroxyl group in the side chain. However, the polyvinyl acetal resin X does not have to have, for example, an acetyl group. For example, the polyvinyl acetal resin X, all of whose acetyl groups are bonded to a linker described later, does not have to have an acetyl group.

When the polyvinyl acetal resin X is synthesized, at least a step of acetalizing polyvinyl alcohol with an aldehyde is included.

The aldehyde used for acetalization of polyvinyl alcohol for obtaining the polyvinyl acetal resin X is not particularly limited. Examples of the aldehyde include an aldehyde having 1 to 10 carbon atoms. The aldehyde may have a chain aliphatic group, a cyclic aliphatic group, or an aromatic group. The aldehyde may be a chain aldehyde or a cyclic aldehyde.

Examples of the aldehyde include formaldehyde, acetaldehyde, propionaldehyde, butyraldehyde, pentanal, hexanal, heptanal, octanal, nonanal, decanal, acrolein, benzaldehyde, cinnamaldehyde, perillaldehyde, formylpyridine, formylimidazole, formylpyrrole, formylpiperidine, formyltriazole, formyltetrazole, formylindole, formylisoindole, formylpurine, formylbenzimidazole, formylbenzotriazole, formylquinoline, formylisoquinoline, formylquinoxaline, formylcinnoline, formylpteridine, formylfuran, formyloxolane, formyloxane, formylthiophene, formylthiolane, formylthiane, formyladenine, formylguanine, formylcytosine, formylthymine, and formyluracil. Only one kind of the aldehyde may be used, or two or more kinds thereof may be used in combination.

The aldehyde is preferably formaldehyde, acetaldehyde, propionaldehyde, butyraldehyde, or pentanal, and more preferably butyraldehyde. Therefore, the polyvinyl acetal skeleton is preferably a polyvinyl butyral skeleton. The polyvinyl acetal resin X is preferably a synthetic resin having a polyvinyl butyral skeleton, and more preferably a polyvinyl butyral resin.

A vinyl compound may be copolymerized with the polyvinyl acetal resin X. That is, the polyvinyl acetal resin X may be a copolymer of a structural unit of the polyvinyl acetal resin and a vinyl compound. In the present invention, the polyvinyl acetal resin copolymerized with the vinyl compound is also referred to as a polyvinyl acetal resin.

The vinyl compound is a compound having a vinyl group ($H_2C=CH-$). The vinyl compound may be a polymer having a structural unit having a vinyl group.

The copolymer may be a block copolymer of a polyvinyl acetal resin and a vinyl compound, or may be a graft copolymer in which a vinyl compound is grafted to a polyvinyl acetal resin. The copolymer is preferably a graft copolymer.

The copolymer can be synthesized, for example, by the following methods (1) to (3). (1) A method for synthesizing a polyvinyl acetal resin using polyvinyl alcohol copolymerized with a vinyl compound. (2) A method for synthesizing a polyvinyl acetal resin using polyvinyl alcohol and polyvinyl alcohol copolymerized with a vinyl compound. (3) A method of graft-copolymerizing a vinyl compound with a polyvinyl acetal resin before graft copolymerization.

Examples of the vinyl compound include ethylene, allylamine, vinylpyrrolidone, vinylimidazole, maleic anhydride, maleimide, itaconic acid, (meth)acrylic acid, vinylamine, and (meth)acrylic acid ester. Only one kind of the vinyl compounds may be used, or two or more kinds thereof may be used in combination.

From the viewpoint of further enhancing the cell adhesion, the polyvinyl acetal resin X preferably has a Brønsted basic group or a Brønsted acidic group, and more preferably has a Brønsted basic group. That is, it is preferable that a part of the polyvinyl acetal resin X is modified with a Brønsted basic group or a Brønsted acidic group, and it is more preferable that a part of the polyvinyl acetal resin X is modified with a Brønsted basic group.

The polyvinyl acetal resin X preferably has a Brønsted basic group or a Brønsted acidic group as a part thereof, and more preferably includes a Brønsted basic group as a part thereof. In that case, the cell adhesion can be further enhanced. In that case, a monomer having a Brønsted basic group or a Brønsted acidic group may be copolymerized or graft-copolymerized. The degree of modification caused by the Brønsted basic group is preferably 0.2 mol % or more, and more preferably 2 mol % or more, as well as preferably 30 mol % or less, more preferably 20 mol % or less, and further preferably 15 mol % or less. The degree of modification caused by the Brønsted basic group within the above-mentioned specific range enables the cell adhesion to be further enhanced.

The Brønsted basic group is a collective term for functional groups capable of receiving a hydrogen ion H+ from other substances. Examples of the Brønsted basic group include amine-based basic groups such as a substituent having an imine structure, a substituent having an imide structure, a substituent having an amine structure, and a substituent having an amide structure. Examples of the Brønsted basic group include, but are not particularly limited to, a hydroxyamino group; a urea group; a conjugated amine-based functional group such as guanidine or biguanide; heterocyclic amino functional groups such as piperazine, piperidine, pyrrolidine, 1,4-diazabicyclo[2.2.2]octane, hexamethylenetetramine, morpholine, pyridine, pyridazine, pyrimidine, pyrazine, pyrrole, azatropylidene, pyridone, imidazole, benzimidazole, benzotriazole, pyrazole, oxazole, imidazoline, triazole, thiazole, thiazine, tetrazole, indole, isoindole, purine, quinoline, isoquinoline, quinazoline, quinoxaline, cinnoline, pteridine, carbazole, acridine, adenine, guanine, cytosine, thymine, uracil, and melamine; cyclopyrrole functional groups such as porphyrin, chlorin, and choline; and derivatives thereof.

Examples of the Brønsted acidic group include a carboxyl group, a sulfonic acid group, a maleic acid group, a sulfinic acid group, a sulfenic acid group, a phosphoric acid group, a phosphonic acid group, and salts thereof. The Brønsted acidic group is preferably a carboxyl group.

The polyvinyl acetal resin X preferably has a structural unit having an imine structure, a structural unit having an imide structure, a structural unit having an amine structure, or a structural unit having an amide structure. In this case, the polyvinyl acetal resin X may have only one of these structural units, or two or more of these structural units.

The polyvinyl acetal resin X may have a structural unit having an imine structure. The imine structure refers to a structure having a C=N bond. In particular, the polyvinyl acetal resin X preferably has an imine structure in the side chain.

The polyvinyl acetal resin X may have a structural unit having an imide structure. The structural unit having an imide structure is preferably a structural unit having an imino group (=NH).

The polyvinyl acetal resin X preferably has an imino group in the side chain. In this case, the imino group may be directly bonded to a carbon atom constituting the main chain of the polyvinyl acetal resin X, or may be bonded to the main chain via a linking group such as an alkylene group.

The polyvinyl acetal resin X may have a structural unit having an amine structure. The amine group in the amine structure may be a primary amine group, a secondary amine group, a tertiary amine group, or a quaternary amine group.

The structural unit having an amine structure may be a structural unit having an amide structure. The amide structure refers to a structure having —C(=O)—NH—.

The polyvinyl acetal resin X preferably has an amine structure or an amide structure in a side chain. In this case, the amine structure or the amide structure may be directly bonded to a carbon atom constituting the main chain of the polyvinyl acetal resin X, or may be bonded to the main chain via a linking group such as an alkylene group.

The content of the structural unit having an imine structure, the content of the structural unit having an imide structure, the content of the structural unit having an amine structure, and the content of the structural unit having an amide structure can be measured by $^1$H-NMR (nuclear magnetic resonance spectrum).

<Synthetic Resin Having Poly(Meth)Acrylic Acid Ester Skeleton>

The protrusions of the cell culture scaffold of the present invention preferably contain a synthetic resin having a poly(meth)acrylic acid ester skeleton. The synthetic resin X preferably contains a synthetic resin having a polyvinyl acetal skeleton.

In the present specification, a "synthetic resin having a poly(meth)acrylic acid ester skeleton" may be referred to as a "poly(meth)acrylic acid ester resin X".

Therefore, the poly(meth)acrylic acid ester resin X is a resin having a poly(meth)acrylic acid ester skeleton.

The poly(meth)acrylic acid ester resin X is obtained by polymerization of a (meth)acrylic acid ester or copolymerization of a (meth)acrylic acid ester with another monomer.

Examples of the (meth)acrylic acid ester include (meth)acrylic acid alkyl ester, (meth)acrylic acid cyclic alkyl ester, (meth)acrylic acid aryl ester, (meth)acrylamides, polyethylene glycol (meth)acrylates, and (meth)acrylic acid phosphorylcholine.

Examples of the (meth)acrylic acid alkyl ester include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-octyl (meth)acrylate, isooctyl (meth)acrylate, 2-ethylhexyl (meth)acrylate, nonyl (meth)acrylate, isononyl (meth)acrylate, decyl (meth)acrylate, isodecyl (meth)acrylate, lauryl (meth)acrylate, stearyl (meth)acrylate, and isotetradecyl (meth)acrylate.

The (meth)acrylic acid alkyl ester may be substituted with a substituent such as an alkoxy group having 1 to 3 carbon atoms and a tetrahydrofurfuryl group. Examples of such (meth)acrylic acid alkyl ester include methoxyethyl acrylate and tetrahydrofurfuryl acrylate.

Examples of the (meth)acrylic acid cyclic alkyl ester include cyclohexyl (meth)acrylate and isobornyl (meth)acrylate.

Examples of the (meth)acrylic acid aryl ester include phenyl (meth)acrylate and benzyl (meth)acrylate.

Examples of the (meth)acrylamide include (meth)acrylamide, N-isopropyl (meth)acrylamide, N-tert-butyl (meth)acrylamide, N,N'-dimethyl (meth)acrylamide, (3-(meth)acrylamidopropyl) trimethylammonium chloride, 4-(meth)acryloylmorpholine, 3-(meth) acryloyl-2-oxazolidinone, N-[3-(dimethylamino)propyl](meth)acrylamide, N-(2-hydroxyethyl) (meth)acrylamide, N-methylol (meth)acrylamide, and 6-(meth)acrylamidohexanoic acid.

Examples of the polyethylene glycol (meth)acrylate include methoxy-polyethylene glycol (meth)acrylate, ethoxy-polyethylene glycol (meth)acrylate, hydroxy-polyethylene glycol (meth)acrylate, methoxy-diethylene glycol (meth)acrylate, ethoxy-diethylene glycol (meth)acrylate, hydroxy-diethylene glycol (meth)acrylate, methoxy-triethylene glycol (meth)acrylate, ethoxy-triethylene glycol (meth)acrylate, and hydroxy-triethylene glycol (meth)acrylate.

Examples of phosphorylcholine (meth)acrylate include 2-(meth) acryloyloxyethyl phosphorylcholine.

As another monomer copolymerized with the (meth)acrylic acid ester, a vinyl compound is suitably used. Examples of the vinyl compound include ethylene, allylamine, vinylpyrrolidone, maleic anhydride, maleimide, itaconic acid, (meth)acrylic acid, vinylamine, and (meth)acrylic acid ester. Only one kind of the vinyl compound may be used, or two or more kinds thereof may be used in combination.

In the present specification, "(meth)acrylic" means "acrylic" or "methacrylic", and "(meth)acrylate" means "acrylate" or "methacrylate".

Similarly to the polyvinyl acetal resin X, the poly(meth)acrylic acid ester resin X preferably includes a Brønsted basic group or a Brønsted acidic group as a part thereof. In that case, the cell adhesion can be further enhanced. The Brønsted basic group is only required to be included in a part of the poly(meth)acrylic acid ester resin X, and in that case, a monomer having a Brønsted basic group may be copolymerized or graft-copolymerized. The degree of modification caused by the Brønsted basic group is preferably 0.2 mol % or more, and more preferably 2 mol % or more, as well as preferably 30 mol % or less, more preferably 20 mol % or less, and further preferably 15 mol % or less. When the degree of modification caused by the Brønsted basic group is within the above-mentioned specific range, the cell adhesion can be further enhanced.

<Synthetic Resin Having Peptide Moiety>

The protrusions of the cell culture scaffold of the present invention preferably contain a synthetic resin having a peptide moiety. The synthetic resin X preferably contains a synthetic resin having a peptide moiety. By using a synthetic resin having a peptide moiety as a material of the protrusions of the cell culture scaffold, the protrusions having peptide moieties on the surface can be obtained. That is, the protrusions preferably have peptide moieties on the surface. In this case, the adhesion with the cells after seeding can be further enhanced, and the cell proliferation rate of the cells can be further enhanced. In this case, high-quality cell masses can be more easily and efficiently formed, and the shape and size of the cell masses can be more easily controlled.

The synthetic resin having a peptide moiety can be obtained by causing a synthetic resin, a linker, and a peptide to react. The synthetic resin having a peptide moiety is preferably a peptide-conjugated polyvinyl acetal resin having a polyvinyl acetal resin moiety, a linker moiety, and a peptide moiety, and more preferably a peptide-conjugated polyvinyl butyral resin having a polyvinyl butyral resin moiety, a linker moiety, and a peptide moiety. Therefore, the synthetic resin having a polyvinyl acetal skeleton (the polyvinyl acetal resin X) is preferably a peptide-conjugated polyvinyl acetal resin, and more preferably a peptide-conjugated polyvinyl butyral resin. Only one kind of the synthetic resin having a peptide moiety may be used, or two or more kinds thereof may be used in combination.

The peptide moiety is preferably composed of three or more amino acids, more preferably four or more amino acids, and further preferably five or more amino acids, as well as preferably ten or less amino acids, and more preferably six or less amino acids. When the number of amino acids constituting the peptide moiety is the above-described lower limit or more and the above-described upper limit or less, the adhesion with cells after seeding can be further enhanced, and the cell proliferation rate can be further enhanced.

The peptide moiety preferably has a cell adhesive amino acid sequence. The cell adhesive amino acid sequence refers to an amino acid sequence whose cell adhesion activity has been confirmed by the phage display method, the Sepharose bead method, or the plate coating method. As the phage display method, for example, the method described in "The Journal of Cell Biology, Volume 130, Number 5, September 1995 1189-1196" can be used. As the Sepharose bead method, for example, the method described in "Protein, Nucleic Acid and Enzyme Vol. 45 No. 15 (2000) 2477" can be used. As the plate coating method, for example, the method described in "Protein, Nucleic Acid and Enzyme Vol. 45 No. 15 (2000) 2477" can be used.

Examples of the cell adhesive amino acid sequence include the RGD sequence (Arg-Gly-Asp), the YIGSR sequence (Tyr-Ile-Gly-Ser-Arg), the PDSGR sequence (Pro-Asp-Ser-Gly-Arg), the HAV sequence (His-Ala-Val), the ADT sequence (Ala-Asp-Thr), the QAV sequence (Gln-Ala-Val), the LDV sequence (Leu-Asp-Val), the IDS sequence (Ile-Asp-Ser), the REDV sequence (Arg-Glu-Asp-Val), the IDAPS sequence (Ile-Asp-Ala-Pro-Ser), the KQAGDV sequence (Lys-Gln-Ala-Gly-Asp-Val), and the TDE sequence (Thr-Asp-Glu). Examples of the cell adhesive amino acid sequence include the sequences described in "Pathophysiology, Vol. 9 No. 7, pp. 527 to 535, 1990" and "Journal of Osaka Women's and Children's Hospital, Vol. 8, No. 1, pp. 58 to 66, 1992". The peptide moiety may have only one type of the cell adhesive amino acid sequence or two or more types thereof.

The cell adhesive amino acid sequence preferably has at least one of the above-described cell adhesive amino acid sequences, more preferably has at least the RGD sequence, the YIGSR sequence, or the PDSGR sequence, and still more preferably has at least the RGD sequence represented by the following formula (1). In this case, the adhesion with the cells after seeding can be further enhanced, and the cell proliferation rate can be further enhanced.

$$\text{Arg-Gly-Asp-X} \qquad \text{Formula (1)}$$

In the above formula (1), X represents Gly, Ala, Val, Ser, Thr, Phe, Met, Pro, or Asn.

The peptide moiety may be linear or may have a cyclic peptide skeleton. The cyclic peptide skeleton is a cyclic skeleton composed of a plurality of amino acids. From the viewpoint of allowing the effects of the present invention to be effectively exhibited, the cyclic peptide skeleton is preferably composed of four or more amino acids, and preferably five or more amino acids, as well as preferably ten or less amino acids.

In the synthetic resin having a peptide moiety, the content of the peptide moiety is preferably 0.1 mol % or more, more preferably 1 mol % or more, still more preferably 5 mol % or more, and particularly preferably 10 mol % or more. In the synthetic resin having a peptide moiety, the content of the peptide moiety is preferably 60 mol % or less, more preferably 50 mol % or less, still more preferably 35 mol % or less, and particularly preferably 25 mol % or less. When the content of the peptide moiety is the above-described lower limit or more, the phase separation structure can be more easily formed. When the content of the peptide moiety is the above-described lower limit or more, the adhesion with the cells after seeding can be further enhanced, and the cell proliferation rate can be further enhanced. When the content of the peptide moiety is the above-described upper limit or less, the production cost can be suppressed. The content (mol %) of the peptide moiety is the amount of substance of the peptide moiety with respect to the sum of the amounts of substances of the respective structural units constituting the synthetic resin having the peptide moiety.

The content of the peptide moiety can be measured by FT-IR or LC-MS.

In the synthetic resin having a peptide moiety, the synthetic resin moiety and the peptide moiety are preferably bonded via a linker. That is, the synthetic resin having a peptide moiety is preferably a synthetic resin having a peptide moiety and a linker moiety. Only one kind of the linker may be used, or two or more kinds thereof may be used in combination.

The linker is preferably a compound having a functional group that can be condensed with a carboxyl group or an amino group of the peptide. Examples of the functional group that can be condensed with a carboxyl group or an amino group of the peptide include a carboxyl group, a thiol group, and an amino group. From the viewpoint of causing a favorable reaction with the peptide, the linker is preferably a compound having a carboxyl group. As the linker, the vinyl compound described above can also be used.

Examples of the linker having a carboxyl group include (meth)acrylic acid and carboxyl group-containing acrylamide. By using a carboxylic acid (carboxylic acid monomer) having a polymerizable unsaturated group as the linker having a carboxyl group, the carboxylic acid monomer can be polymerized by graft polymerization upon the reaction of the linker with the synthetic resin, which makes it possible to increase the number of carboxyl groups that can be caused to react with the peptide.

<Other Resins>

The protrusions of the cell culture scaffold may contain a polymer other than the synthetic resin described above. Examples of the polymer include polyvinylpyrrolidone, polystyrene, an ethylene-vinyl acetate copolymer, a polyolefin resin, a polyether resin, a polyvinyl alcohol resin, polyester, an epoxy resin, a polyamide resin, a polyimide resin, a polyurethane resin, and a polycarbonate resin.

[Substrate]

A cell culture scaffold of the present invention includes a substrate. A part of the surface of the substrate constitutes a portion where no protrusion is provided. Therefore, it is preferable that the substrate is made of a material that allows a smaller number of cells to adhere thereto per unit area, as compared with the protrusions.

Examples of the material of the substrate include a resin, a metal, and an inorganic material. Examples of the resin include polystyrene, polyethylene, polypropylene, polycarbonate, polyester, polyisoprene, a cycloolefin polymer, polyimide, polyamide, polyamideimide, a (meth)acrylic resin, an epoxy resin, and silicone. Examples of the metal include stainless steel, copper, iron, nickel, aluminum, titanium, gold, silver, and platinum. Examples of the inorganic material include silicon oxide (glass), aluminum oxide, titanium oxide, zirconium oxide, iron oxide, and silicon nitride.

[Other Details of Cell Culture Scaffold]

The protrusions of the cell culture scaffold according to the present invention contains the synthetic resin X. From the viewpoint of allowing the effects of the present invention to be effectively exhibited, and from the viewpoint of enhancing productivity, the content of the synthetic resin X in 100 wt % of the protrusions of the cell culture scaffold is preferably 90 wt % or more, more preferably 95 wt % or more, still more preferably 97.5 wt % or more, particularly preferably 99 wt % or more, and most preferably 100 wt % (whole amount). Therefore, the protrusion of the cell culture scaffold is most preferably the synthetic resin X. When the content of the synthetic resin X is the above-described lower limit or more, the effect of the present invention can be more effectively exhibited.

When the synthetic resin X contained in the protrusion contains a polyvinyl alcohol derivative, the content of the polyvinyl alcohol derivative in 100 wt % of the synthetic resin X is preferably 90 wt % or more, more preferably 95 wt % or more, still more preferably 97.5 wt % or more, particularly preferably 99 wt % or more, and most preferably 100 wt % (whole amount). Therefore, the synthetic resin X contained in the protrusions is most preferably a polyvinyl alcohol derivative. When the content of the polyvinyl alcohol derivative is the above-described lower limit or more, the effects of the present invention can be more effectively exhibited.

When the synthetic resin X contained in the protrusions contains a poly(meth)acrylic resin, the content of the poly (meth)acrylic resin in 100 wt % of the synthetic resin X is preferably 90 wt % or more, more preferably 95 wt % or more, still more preferably 97.5 wt % or more, particularly preferably 99 wt % or more, and most preferably 100 wt % (whole amount). Therefore, the synthetic resin X contained in the protrusions is most preferably a poly(meth)acrylic resin. When the content of the poly(meth)acrylic resin is the above-described lower limit or more, the effect of the present invention can be more effectively exhibited.

The protrusions of the cell culture scaffold may contain components other than the synthetic resin X. Examples of the component other than the synthetic resin X include polysaccharides, cellulose, and synthetic peptides.

From the viewpoint of allowing the effects of the present invention to be effectively exhibited, the content of components other than the synthetic resin X is preferably as small as possible. The content of the component in 100 wt % of the protrusions of the cell culture scaffold is preferably 10 wt % or less, more preferably 5 wt % or less, still more preferably 2.5 wt % or less, particularly preferably 1 wt % or less, and most preferably 0 wt % (the protrusions are free from the component). Therefore, it is most preferable that the protrusions of the cell culture scaffold do not contain any component other than the synthetic resin X.

The cell culture scaffold preferably does not contain an animal-derived raw material. It is possible to provide a cell culture scaffold that has high safety and little variation in quality at the time of manufacturing, when the cell culture scaffold does not contain any animal-derived raw material. The phrase "substantially does not contain an animal-derived raw material" means that the animal-derived raw material in the cell culture scaffold accounts for 3 wt % or less. In the cell culture scaffold, the animal-derived raw material in the cell culture scaffold is preferably 1 wt % or less, and most preferably 0 wt %. That is, it is most preferable that the cell culture scaffold of the present invention is free from any animal-derived raw material.

In the protrusion of the cell culture scaffold, the raw material derived from an animal in the protrusion preferably accounts for 3 wt % or less, more preferably 1 wt % or less, and most preferably 0 wt %. That is, it is most preferable that the protrusions of the cell culture scaffold are free from any animal-derived raw material.

(Cell Culture Using Cell Culture Scaffold)

The cell culture scaffold according to the present invention is used for culturing cells. The cell culture scaffold according to the present invention is used as a scaffold for cells when the cells are cultured.

Examples of the cells include cells of animals such as humans, mice, rats, pigs, cows, and monkeys. Examples of the cells include somatic cells, and include stem cells, progenitor cells, and mature cells. The somatic cell may be a cancer cell.

Examples of the stem cells include mesenchymal stem cells (MSC), iPS cells, ES cells, Muse cells, embryonic cancer cells, embryonic germ cells, and mGS cells.

Examples of the mature cells include nerve cells, cardiomyocytes, retinal cells, and hepatocytes.

[Cell Culture Container]

Figure 3:
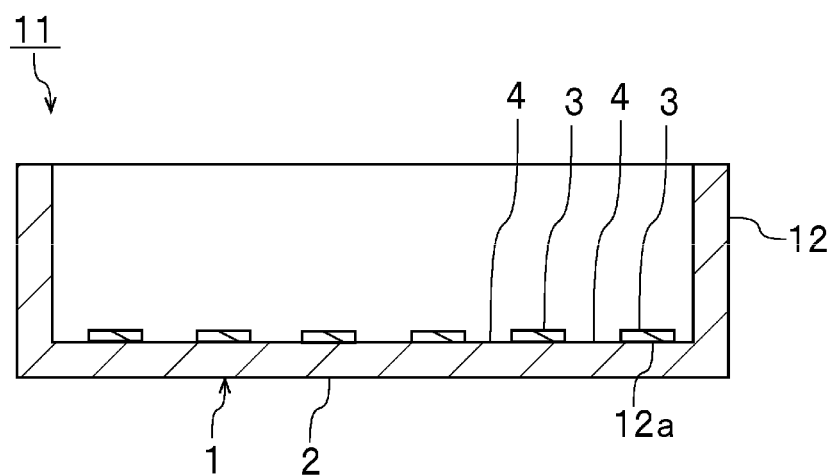
FIG. 3 is a schematic front cross-sectional view showing a cell culture container according to an embodiment of the present invention.

The present invention also relates to a cell culture container including the above-described cell culture scaffold in at least a part of a cell culture region. FIG. 3 is a schematic front cross-sectional view showing a cell culture container according to an embodiment of the present invention.

The cell culture container 11 includes a container body 12. The container body 12 has a bottom portion that serves as the substrate 2 of the cell culture scaffold 1. Therefore, the protrusions 3 are provided on a surface 12a of the container body 12.

By adding a liquid medium to the cell culture container 11 and seeding cells on the surface of the cell culture scaffold 1, the cells can be plane-cultured.

The container body may include a second container body such as a cover glass on the bottom surface of the first container body. The first container body and the second container body may be separable. In this case, at least a part of the second container body may be the substrate of the cell culture scaffold.

As the container body, a conventionally known container body (container) can be used. The shape and size of the container body are not particularly limited.

Examples of the container body include a cell culture plate including one or a plurality of wells (holes), and a cell culture flask. The number of wells of the plate is not particularly limited. The number of wells is not particularly limited, and examples thereof include 2, 4, 6, 12, 24, 48, 96, and 384. The shape of the well is not particularly limited, and examples thereof include a perfect circle, an ellipse, a triangle, a square, a rectangle, and a pentagon. The shape of the well bottom surface is not particularly limited, and examples thereof include a flat bottom and a round bottom.

The material of the container body is not particularly limited, and examples thereof include a resin, a metal, and an inorganic material. Examples of the resin include polystyrene, polyethylene, polypropylene, polycarbonate, polyester, polyisoprene, a cycloolefin polymer, polyimide, polyamide, polyamideimide, a (meth)acrylic resin, an epoxy resin, and silicone. Examples of the metal include stainless steel, copper, iron, nickel, aluminum, titanium, gold, silver, and platinum. Examples of the inorganic material include silicon oxide (glass), aluminum oxide, titanium oxide, zirconium oxide, iron oxide, and silicon nitride. In this case, since the substrate of the cell culture scaffold is also a part of the container body, the same material as the material constituting the container body can be used for the substrate.

EXAMPLE

Next, the present invention will be clarified by giving specific Examples and Comparative Examples of the present invention. Note that the present invention is not limited to the following Examples.

As raw materials of scaffolds for cell culture, the following synthetic resins X1 to X9 were synthesized. The content of the structural unit in the obtained synthetic resin was measured by $^1$H-NMR (nuclear magnetic resonance spectrum) after the synthetic resin was dissolved in DMSO-D6 (dimethyl sulfoxide).

<Synthetic Resin X1>

Into a reactor equipped with a stirrer, 2700 mL of ion-exchanged water, and 300 parts by weight of amine-modified polyvinyl alcohol having an average polymerization degree of 800, an amine modification degree of 1 mol %, and a saponification degree of 99 mol % were charged, and heated and dissolved with stirring, whereby a solution was obtained. To the obtained solution, 35 wt % hydrochloric acid was added as a catalyst so that the hydrochloric acid concentration was 0.2 wt %. Then, the temperature was adjusted to 15° C., and 22 parts by weight of n-butyraldehyde was added while stirring. Next, 148 parts by weight of n-butyraldehyde was added to precipitate a white particulate polyvinyl butyral resin. Fifteen minutes after precipitation, 35 wt % hydrochloric acid was added so that the hydrochloric acid concentration was 1.8 wt %, then it was heated to 50° C., and was held at 50° C. for 2 hours. Subsequently, the solution was cooled and neutralized, and then the polyvinyl butyral resin was washed with water and dried to obtain a synthetic resin X1 as a polyvinyl butyral resin.

The obtained polyvinyl butyral resin (synthetic resin X1) had an average polymerization degree of 800, a hydroxyl group amount of 20 mol %, an amine group amount of 1 mol %, an acetylation degree of 1 mol %, and an acetalization degree (butyralization degree) of 78 mol %.

<Synthetic Resin X2>

A polyvinyl butyral resin was obtained in the same manner as in the case of the synthetic resin X1 except that polyvinyl alcohol having an average polymerization degree of 300 and a saponification degree of 99 mol % was used in place of the amine-modified polyvinyl alcohol. Twenty parts by weight of the obtained polyvinyl butyral resin was dissolved in 80 parts by weight of tetrahydrofuran (THF), and 2 parts by weight of dimethylaminoacrylamide was added thereto. Next, 0.1 parts by weight of Irgacure184 (manufactured by IGM Resins B.V.) as an initiator was dissolved therein, and UV irradiation was performed for 20 minutes with a UV polymerization tester to obtain a synthetic resin X2 having the configuration shown in Table 1.

<Synthetic Resin X3>

A polyvinyl butyral resin (synthetic resin X3) having the configuration shown in Table 1 was obtained in the same manner as in the case of the synthetic resin X2 except that the added amount of dimethylaminoacrylamide was changed from 2 parts by weight to 8 parts by weight.

<Synthetic Resin X4>

A polyvinyl butyral resin (synthetic resin X4) having the configuration shown in Table 1 was obtained in the same manner as in the case of the synthetic resin X2 except that polyvinyl alcohol having an average polymerization degree of 250 and a saponification degree of 99 mol % was used, and 10 parts by weight of diethylaminoacrylamide was used in place of dimethylaminoacrylamide.

<Synthetic Resin X5>

A polyvinyl butyral resin (synthetic resin X5) having the configuration shown in Table 1 was obtained in the same manner as in the case of the synthetic resin X4 except that 5 parts by weight of vinylimidazole was used in place of diethylaminoacrylamide, and the content ratio of the same was set to 13 mol %.

<Synthetic Resin X6>

A polyvinyl butyral resin having the configuration shown in Table 1 was used.

<Synthetic Resin X7>

A polyvinyl acetal resin (polyvinyl butyral resin) was obtained in the same manner as in the case of the synthetic resin X1 except that polyvinyl alcohol having an average polymerization degree of 250 and a saponification degree of 98 mol % was used in place of the amine-modified polyvinyl alcohol.

Introduction of Linker:

In 300 parts by weight of THF, 90 parts by weight of the obtained polyvinyl acetal resin and 15 parts by weight of acrylic acid (linker) were dissolved, and a reaction was caused to occur therebetween in the presence of a photo-radical polymerization initiator under ultraviolet irradiation for 20 minutes so that the polyvinyl acetal resin and the acrylic acid were graft-copolymerized, whereby the linker was introduced.

Formation of Peptide Moiety:

As a peptide, a linear peptide having an amino acid sequence of Gly-Arg-Gly-Asp-Ser (amino acid residues were 5 in number, and this sequence is described as GRGDS in Table) was prepared. To 80 parts by weight of methanol containing neither calcium nor magnesium, 10 parts by weight of this peptide and 10 parts by weight of 1-ethyl-3-(3-dimethylaminopropyl)carbodiimide hydrochloride (condensing agent) were added, to prepare a peptide-containing solution. To 300 parts by weight of methanol, 100 parts by weight of this peptide-containing solution and 80 parts by weight of a polyvinyl acetal resin having a linker introduced therein were added, and a reaction was caused to occur to dehydrate and condense the carboxyl group of the linker moiety and the amino group of the peptide. After completion of the reaction, vacuum drying was performed at 60° C. for 1 hour to volatilize methanol. In this way, a peptide-conjugated polyvinyl acetal resin (synthetic resin X7) having a polyvinyl acetal resin moiety, a linker moiety, and a peptide moiety was produced.

<Synthetic Resin X8>

A polyvinyl butyral resin into which a linker was introduced was obtained in the same manner as in the case of the synthetic resin X7. Using this resin, the peptide moiety were formed as follows.

Formation of Peptide Moiety:

A cyclic peptide having an amino acid sequence of Arg-Gly-Asp-Phe-Lys (amino acid residues were 5 in number, Arg and Lys were bonded to form a cyclic skeleton, Phe was D-form, and this sequence is described as c-RGDfK in Table) was prepared. To 80 parts by weight of methanol containing neither calcium nor magnesium, 10 parts by weight of this peptide and 10 parts by weight of 1-ethyl-3-(3-dimethylaminopropyl)carbodiimide hydrochloride (condensing agent) were added, to prepare a peptide-containing solution. To 300 parts by weight of methanol, 100 parts by weight of this peptide-containing solution and 80 parts by weight of a polyvinyl acetal resin having a linker introduced therein were added, and a reaction was caused to occur to dehydrate and condense the carboxyl group of the linker moiety and the amino group of the peptide. After completion of the reaction, vacuum drying was performed at 60° C. for 1 hour to volatilize methanol. In this way, a peptide-conjugated polyvinyl acetal resin (synthetic resin X8) having a polyvinyl acetal resin moiety, a linker moiety, and a cyclic peptide moiety was prepared.

<Synthetic Resin X9>

A (meth)acrylic monomer solution was obtained by mixing 23.4 parts by weight of butyl methacrylate and 76.6 parts by weight of methoxymethyl acrylate. Next, 0.5 parts by weight of Irgacure184 (manufactured by BASF) was dissolved in the obtained (meth)acrylic monomer solution, and the solution was applied onto a PET film. The applied product was irradiated with light having a wavelength of 365 nm at an integrated light amount of 2000 mJ/cm$^2$ using a UV conveyor device "ECS301G1" manufactured by Eye Graphics Co., Ltd. at 25° C. to obtain a poly(meth)acrylic acid ester resin (synthetic resin X9).

Examples 1 to 13 and Comparative Examples 1 to 2

In Examples 1, 2, and 8 to 10 and Comparative Example 2, the synthetic resin X1 was used. In Examples 3 to 7, the synthetic resins X2 to X6 were used, respectively. In Examples 11 to 13, the synthetic resins X7 to X9 were used, respectively.

Figure 4:
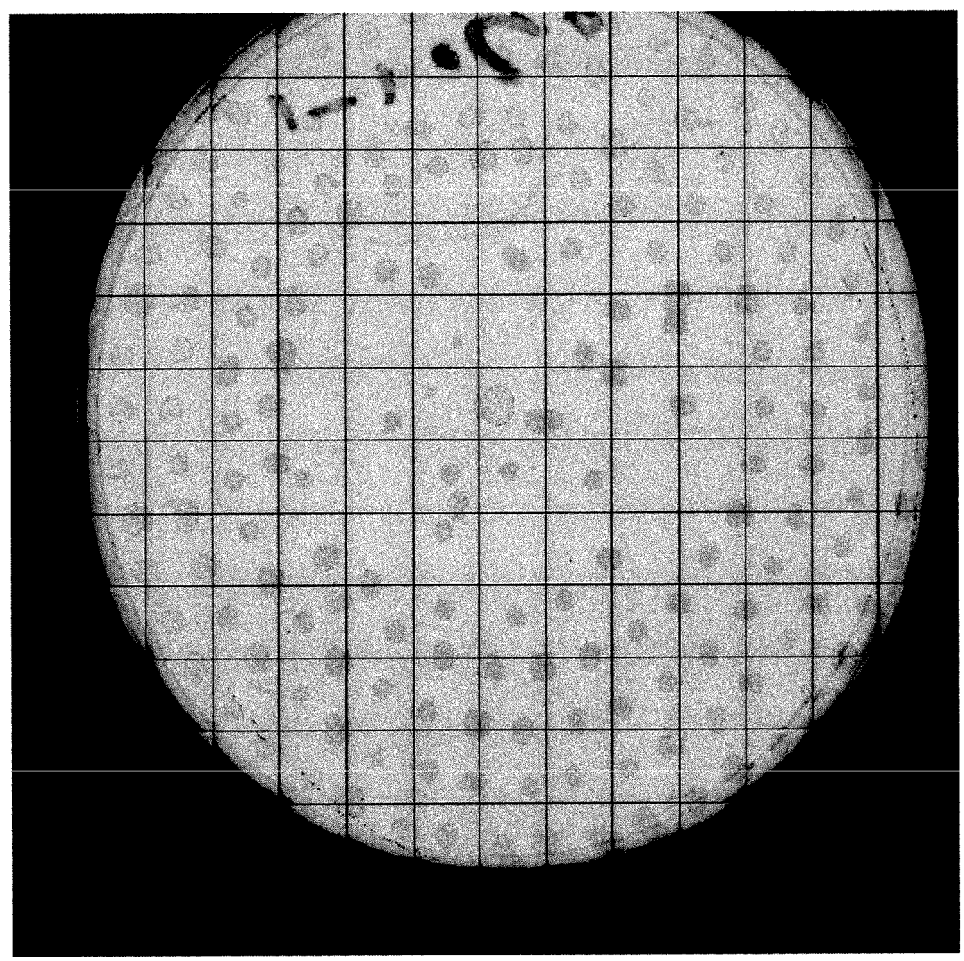
FIG. 4 is a photograph showing a pattern of protrusions in the cell culture scaffold prepared in Example 1.
Figure 5:
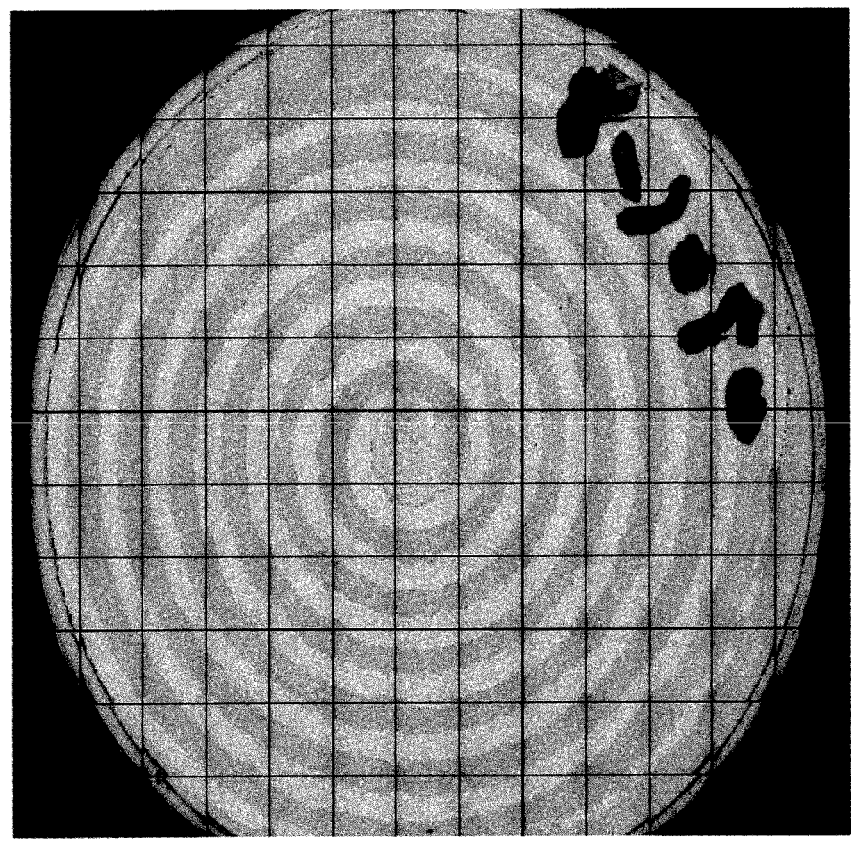
FIG. 5 is a photograph showing a pattern of protrusions in a cell culture scaffold prepared in Example 2.

Production of Cell Culture Container;

In Examples 1 to 7 and 13, each synthetic resin was dissolved in butanol at a concentration of 5 wt %. The obtained solution was patterned in dots or lines on a polystyrene dish having a diameter of 35 mm using a dispenser, and then dried in an oven at 45° C. for 6 hours to prepare a cell culture container having a bottom constituted of a cell culture scaffold having a plurality of protrusions. As shown in FIG. 4, in the cell culture scaffold produced in Example 1, a pattern of dots was produced. In Examples 3 to 7, a pattern of dots was similarly produced. In addition, as shown in FIG. 5, in the cell culture scaffold produced in Example 2, a spiral pattern was produced as a linear pattern.

In Examples 8 to 12, each synthetic resin was dissolved in butanol at a concentration of 0.5 wt %. The obtained solution was patterned into dots on a polystyrene dish having a diameter of 35 mm using a dispenser, then left standing at normal temperature for 30 minutes, and dried in an oven at 45° C. for 6 hours to prepare a cell culture container having a bottom constituted of a cell culture scaffold having a plurality of protrusions. In Examples 8 to 12, protrusions each having a wall portion at the peripheral edge portion were obtained.

In Comparative Example 1, the polystyrene dish itself was used as a cell culture container.

In Comparative Example 2, the synthetic resin X1 was dissolved in butanol at a concentration of 5 wt %. On a polystyrene dish, 40 μL of the obtained solution was cast, and then dried in an oven at 45° C. for 6 hours to form a planar film.

(Evaluation)
(1) Pattern Shape;

Image observation was performed using a hybrid laser microscope OPTELICS HYBRID (manufactured by Lasertec Inc., the objective lens used when measuring the average protrusion height was CFI T Plan EPI SLWD 20x, the measurement mode was the surface shape measurement mode, and the resolution was 0.45 μm), and the following were measured:

an average protrusion bottom area when the protrusions were in a pattern of dots;

an average protrusion line width when the protrusions were in a pattern of lines;

an average protrusion height of the portions located at the protrusion center positions in plan view; and an average wall portion height Note that the average protrusion bottom area is an average value of the bottom areas of randomly selected ten protrusions. The average protrusion line width is an average value of line widths at randomly selected ten positions that are separated from each other by 10 μm or more. The average protrusion height of the portions at the protrusion center positions in plan view is an average value of the protrusion heights at the center positions of randomly selected ten protrusions in plan view when the protrusions are in a pattern of dots, and it is an average value of the heights of the protrusions at the line width center positions of 10 places separated from each other by 10 μm or more when the protrusions are in a pattern of lines. The average wall portion height is an average value of the heights of the wall portions of randomly selected ten protrusions.

(2) Protein Adsorption Amount Ratio;

To each cell culture container, 40 μL of FITC-labeled bovine serum albumin (manufactured by Cosmo Bio Co., Ltd.) at 0.1 mg/mL was cast and allowed to stand at 37° C. for 1 hour, and then the polystyrene dish was washed with pure water and dried in an oven at 45° C. for 1 hour. In addition, for calibration of the protein adsorption amount, 1 μL of FITC-labeled bovine serum albumin at 0.005 mg/mL, 0.02 mg/mL, and 0.05 mg/mL, respectively, was dispensed into polystyrene dishes, and dried in an oven at 45° C. for 1 hour. Each cell culture container was photographed using a fluorescence microscope, and the fluorescence intensity of the protrusion and the portion where no protrusion was provided was obtained. Based on a linear approximation value of a fluorescence intensity determined by using the polystyrene dish for calibration curve, conversion into a protein adsorption amount was carried out. From the obtained protein adsorption amount of the protrusion and the protein adsorption amount of the portion where no protrusion was provided, a ratio of the protein adsorption amount of the protrusion with respect to the protein adsorption amount of the portion where no protrusion was provided (a protein adsorption amount of the protrusions/a protein adsorption amount of the portion where no protrusion was provided) was calculated.

Water Swelling Rate of Protrusion;

Each cell culture container was immersed in water at 25° C. for 24 hours. The cell culture container after immersion was allowed to stand on a Kimtowel for 10 minutes with the opening of the cell culture container facing downward, and the water adhering to the cell culture container was removed. Next, the weight of the polystyrene dish was subtracted from the weight of the cell culture container before immersion to obtain the weight of the sample before immersion. The weight of the polystyrene dish was subtracted from the weight of the cell culture container after immersion to obtain the weight of the sample after immersion. From the weight of the sample before immersion and the weight of the sample after immersion, the water swelling rate=(weight of sample after immersion−weight of sample before immersion)/(weight of sample before immersion)×100(%) was calculated. Note that the weight of the polystyrene dish itself does not change before and after immersion.

(3) Elastic modulus of protrusion at protrusion center position in plan view;

The surface elastic modulus at 25° C. at the center position of the upper surface of the protrusion of each cell culture scaffold was determined using a nanoindenter (Hysitron, Triboindenter, manufactured by Bruker Corporation). As an indenter, a Berkovich (triangular pyramid type) indenter having a tip radius R of several-hundred nanometers was used, and single indentation measurement was performed at 25° C. in the atmosphere. The indentation depth was 50 nm. In Comparative Example 2, the surface elastic modulus of the planar film was measured.

(4) Seeding and Culture of Cells;

The following liquid medium and ROCK (Rho-binding kinase)-specific inhibitor were prepared.

TeSR E8 medium (manufactured by STEM CELL)
ROCK-Inhibitor (Y27632)

To the obtained cell culture container, 1 mL of phosphate buffered saline was added, then, the container was allowed to stand in an incubator at 37° C. for 1 hour, and the phosphate buffered saline was removed from the cell culture container.

Colonies of the h-iPS cells 253G1 in a confluent state were placed in a φ35 mm dish, 1 mL of a 0.5 mM ethylenediamine/phosphate buffer solution was added, and the dish was allowed to stand at room temperature for 2 minutes. The ethylenediamine/phosphate buffer solution was removed, and pipetting with 1 mL of the TeSR E8 medium was performed to obtain cell masses crushed to a size of 50 μm to 200 μm. The obtained cell masses (the number of cells: $0.2 \times 10^5$ cells) were clamped and seeded in the cell culture container.

At the time of seeding, the cells were cultured in an incubator at 37° C. and a $CO_2$ concentration of 5% in which 1.5 mL of a liquid medium and a ROCK-specific inhibitor were added to a cell culture container so that the final concentration was 10 μM. Thereafter, an operation of replacing the liquid in the cell culture container with 1.5 mL of a fresh liquid medium was repeated every 24 hours for culture for 5 days. In the operation, the cells released and floating from the scaffold were collected by pipetting and discarded.

The cell culture container after cell culture was observed using a hybrid microscope, and the uniformity of the cell masses formed on the scaffold was evaluated. In addition, for cell adhesion, whether the cell masses adhered or not was observed with a phase contrast microscope and evaluated.

Figure 6:
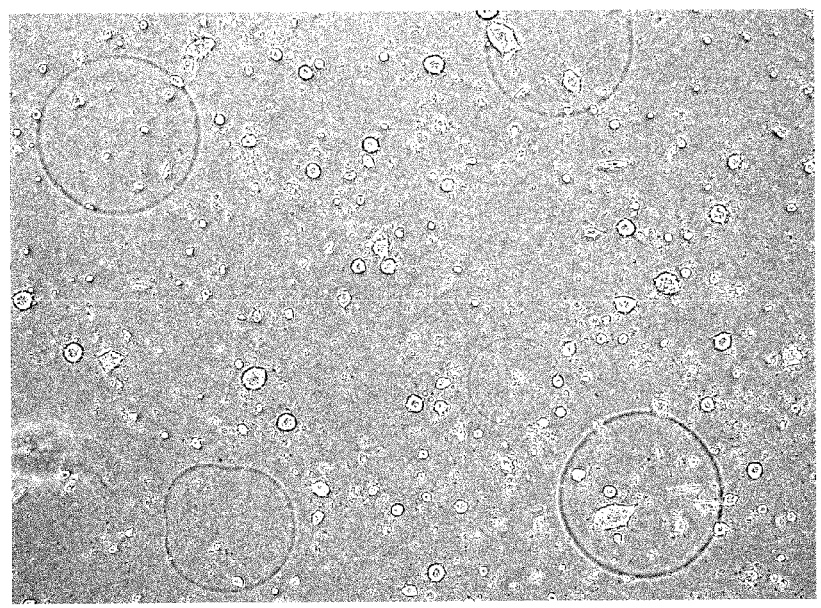
FIG. 6 is a micrograph showing cells when the cells were seeded in the cell culture container prepared in Example 1.
Figure 7:
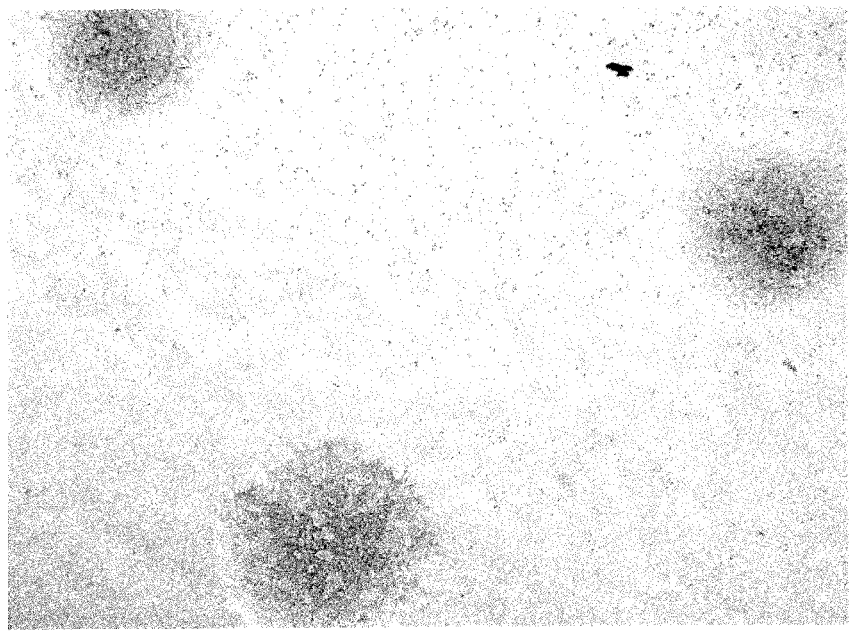
FIG. 7 is a micrograph after 5-day cell culture in the cell culture container prepared in Example 1.

FIG. 6 is a micrograph showing cells when the cells were seeded in the cell culture container prepared in Example 1. FIG. 7 is a micrograph showing cells cultured in the cell culture container prepared in Example 1 for 5 days.

In Example 1, cell masses corresponding to the pattern of the scaffold could be easily and efficiently formed, as is clear from FIG. 7. Similarly, the cases of Examples 2 to 13 were also observed, and it was confirmed that cell masses corresponding to the pattern of the scaffold could be easily and efficiently formed.

In addition, the cases of Example 1 to 13 and Comparative Example 1 to 2 were observed and evaluated according to the following evaluation criteria.

[Evaluation Criteria]

(Uniformity of Cell Masses)

After culturing for 5 days, the cells in the wells were observed using a phase contrast microscope, and ten cell masses were randomly selected. The area (plane area) of the cell mass viewed in plan view with a microscope was calculated, and the degree of dispersion of the plane area of the cell masses was calculated by the following formula (A).

[Mathematical formula 1]

$$D = \frac{1}{n}\sum_{i=1}^{n}(x_i - x)^2 \quad (A)$$

D: Dispersion degree of plane area of cell mass n: Number of data

Xi: Plane area of cell mass

X: Average value of plane areas of cell masses

[Criteria for Determination of Uniformity of Cell Masses]

A . . . Dispersion degree is less than 0.001

B . . . Dispersion degree is 0.001 or more and less than 0.002

C . . . Dispersion degree is 0.002 or more and less than 0.003

D . . . Dispersion degree is 0.003 or more (Adhesion of cell masses)

After culturing for 5 days, the cell masses in the well were observed using a phase contrast microscope, and the adhesion of the cell masses formed was evaluated according to the following criteria.

[Criteria for determination of adhesion of cell masses]

A . . . All cell masses adhere

B . . . Cell masses are partially detached

C . . . All cell masses are detached

The results are shown in Tables 1 and 2 below.

TABLE 1

|  |  |  | Example 1 | Example 2 | Example 3 | Example 4 | Example 5 | Example 6 | Example 7 |
|---|---|---|---|---|---|---|---|---|---|
| Protrusion | | Type of synthetic resin | X1 | X1 | X2 | X3 | X4 | X5 | X6 |
| | Polyvinyl acetal resin | Acetalization degree (mol %) | 78 | 78 | 68 | 55 | 53 | 63 | 40 |
| | | Acetylation degree (mol %) | 1 | 1 | 1 | 1 | 1 | 1 | 3 |
| | | Hydroxyl group (mol %) | 20 | 20 | 26 | 24 | 18 | 23 | 57 |
| | | Amine/imine modification degree (mol %) | 1 | 1 | | | | | |
| | Acrylate | Dimethylaminoacrylamide (mol %) | | | 5 | 20 | | | |
| | | Diethylaminoacrylamide (mol %) | | | | | 28 | | |
| | | Butyl methacrylate (mol %) | | | | | | | |
| | | Methoxymethyl acrylate (mol %) | | | | | | | |
| | | Acrylic acid (mol %) | | | | | | | |
| | Vinyl compound | Vinylimidazole (mol %) | | | | | | 13 | |
| | Peptide | GRGDS (mol %) | | | | | | | |
| | | c-RGDfK (mol %) | | | | | | | |
| | | Average polymerization degree | 800 | 800 | 300 | 300 | 250 | 250 | 250 |
| | Surface structure | Pattern shape | Dot form | Line form | Dot form | Dot form | Dot form | Dot form | Dot form |
| | | Number of protrusions | 100 | 1 | 100 | 100 | 100 | 40 | 100 |
| | | Average protrusion bottom area (mm$^2$) | 0.785 | — | 0.785 | 0.785 | 0.785 | 1.5 | 0.785 |
| | | Average protrusion height of portions located at protrusion center positions in plan view (nm) | 200 | 200 | 150 | 300 | 200 | 50 | 200 |
| | | Average protrusion line width (μm) | — | 500 | — | — | — | — | — |
| | | Average wall portion height (nm) | — | — | — | — | — | — | — |
| | | Protein adsorption amount ratio (protrusion/portion where no protrusion is provided) | 3.2 | 2.9 | 3.1 | 4.2 | 4.8 | 6.2 | 1.5 |
| | | Water swelling rate of protrusion (%) | 18 | 15 | 12 | 22 | 14 | 7 | 55 |
| | | Elastic modulus at the protrusion center positions in plan view (GPa) | 3 | 3 | 3 | 2.8 | 2.5 | 2.9 | 1.1 |
| Culturing | Uniformity of cell masses | Degree of dispersion of plane area of cell masses | 0.0027 | 0.0026 | 0.0027 | 0.0023 | 0.0021 | 0.0022 | 0.0028 |
| | | Determination | C | C | C | C | C | C | C |
| | Adhesion of cell masses | Determination | A | A | A | A | A | A | B |

TABLE 2

|  |  |  | Example 8 | Example 9 | Example 10 | Example 11 |
|---|---|---|---|---|---|---|
| Protrusion | | Type of synthetic resin | X1 | X1 | X1 | X7 |
| | Polyvinyl acetal resin | Acetalization degree (mol %) | 78 | 78 | 78 | 58 |
| | | Acetylation degree (mol %) | 1 | 1 | 1 | 2 |
| | | Hydroxyl group (mol %) | 20 | 20 | 20 | 20 |
| | | Amine/imine modification degree (mol %) | 1 | 1 | 1 | |
| | Acrylate | Dimethylaminoacrylamide (mol %) | | | | |
| | | Diethylaminoacrylamide (mol %) | | | | |
| | | Butyl methacrylate (mol %) | | | | |
| | | Methoxymethyl acrylate (mol %) | | | | |
| | | Acrylic acid (mol %) | | | | 10 |
| | Vinyl compound | Vinylimidazole (mol %) | | | | |
| | Peptide | GRGDS (mol %) | | | | 10 |
| | | c-RGDfK (mol %) | | | | |
| | | Average polymerization degree | 800 | 800 | 800 | 250 |
| | Surface structure | Pattern shape | Dot form | Dot form | Dot form | Dot form |
| | | Number of protrusions | 500 | 100 | 5 | 100 |
| | | Average protrusion bottom area (mm$^2$) | 0.00785 | 0.785 | 3.14 | 0.785 |
| | | Average protrusion height of portions located at protrusion center positions in plan view (nm) | 100 | 100 | 100 | 100 |
| | | Average protrusion line width (μm) | — | — | — | — |

TABLE 2-continued

|  |  |  |  |  |  |  |
|---|---|---|---|---|---|---|
|  |  | Average wall portion height (nm) | 1000 | 1000 | 1000 | 1000 |
|  |  | Protein adsorption amount ratio (protrusion/portion where no protrusion is provided) | 3.2 | 3.2 | 3.2 | 2.8 |
|  |  | Water swelling rate of protrusion (%) | 18 | 18 | 18 | 25 |
|  |  | Elastic modulus at the protrusion center positions in plan view (GPa) | 3 | 3 | 3 | 3.5 |
| Culturing | Uniformity of cell masses | Degree of dispersion of plane area of cell masses | 0.0012 | 0.0015 | 0.0018 | 0.00073 |
|  |  | Determination | B | B | B | A |
|  | Adhesion of cell masses | Determination | A | A | A | A |

|  |  |  | Example 12 | Example 13 | Comparative Example 1 | Comparative Example 2 |
|---|---|---|---|---|---|---|
| Protrusion |  | Type of synthetic resin | X8 | X9 | — | X1 |
|  | Polyvinyl acetal resin | Acetalization degree (mol %) | 58 |  |  | 78 |
|  |  | Acetylation degree (mol %) | 2 |  |  | 1 |
|  |  | Hydroxyl group (mol %) | 20 |  |  | 20 |
|  |  | Amine/imine modification degree (mol %) |  |  |  | 1 |
|  | Acrylate | Dimethylaminoacrylamide (mol %) |  |  |  |  |
|  |  | Diethylaminoacrylamide (mol %) |  |  |  |  |
|  |  | Butyl methacrylate (mol %) |  | 25 |  |  |
|  |  | Methoxymethyl acrylate (mol %) |  | 75 |  |  |
|  |  | Acrylic acid (mol %) | 10 |  |  |  |
|  | Vinyl compound | Vinylimidazole (mol %) |  |  |  |  |
|  | Peptide | GRGDS (mol %) |  |  |  |  |
|  |  | c-RGDfK (mol %) | 10 |  |  |  |
|  |  | Average polymerization degree | 250 | 250 | — | 800 |
|  | Surface structure | Pattern shape | Dot form | Dot form | NA | NA |
|  |  | Number of protrusions | 100 | 100 |  |  |
|  |  | Average protrusion bottom area (mm²) | 0.785 | 0.785 |  |  |
|  |  | Average protrusion height of portions located at protrusion center positions in plan view (nm) | 100 | 100 |  |  |
|  |  | Average protrusion line width (μm) | — | — |  |  |
|  |  | Average wall portion height (nm) | 1000 | — |  |  |
|  |  | Protein adsorption amount ratio (protrusion/portion where no protrusion is provided) | 2.8 | 1.5 |  |  |
|  |  | Water swelling rate of protrusion (%) | 25 | 35 | NA | 23 |
|  |  | Elastic modulus at the protrusion center positions in plan view (GPa) | 3.5 | 0.1 | NA | 3 |
| Culturing | Uniformity of cell masses | Degree of dispersion of plane area of cell masses | 0.00085 | 0.0028 | 0.01 | 0.0087 |
|  |  | Determination | A | C | D | D |
|  | Adhesion of cell masses | Determination | A | B | C | A |

EXPLANATION OF SYMBOLS

1: Cell culture scaffold
2, 2A: Substrate
3, 3A: Protrusion
4: Portion where no protrusion is provided
11: Cell culture container
12: Container body
12a: Surface
31A: Wall portion
Ha: Height of protrusion at protrusion center position in plan view
Hb: Height of wall portion
Tb: Thickness of wall portion

The invention claimed is:

1. A cell culture scaffold comprising:
a substrate; and
a protrusion formed by patterning in a pattern of a dot or a line on the substrate,
the protrusion containing a synthetic resin,
the synthetic resin containing a peptide-conjugated polyvinyl acetal resin,
the peptide-conjugated polyvinyl acetal resin having a polyvinyl acetal resin moiety, a linker moiety, and a peptide moiety,
the protrusion having cell adhesion, and
a portion of the protrusion located at the protrusion center position in plan view having an average height of 10 nm or more and 10 μm or less.

2. The cell culture scaffold according to claim 1, wherein the ratio of a protein adsorption amount of the protrusion with respect to that of a portion where no protrusion is provided (a protein adsorption amount of the protrusion/a protein adsorption amount of the portion where no protrusion is provided) is 2 or more.

3. The cell culture scaffold according to claim 1, wherein the protrusion is formed by patterning in a pattern of a dot on the substrate, and the protrusion has an average bottom area of 0.005 mm$^2$ or more and 5 mm$^2$ or less.

4. The cell culture scaffold according to claim 1, wherein the protrusion has a wall portion at a peripheral edge part.

5. The cell culture scaffold according to claim 1, wherein the protrusion has an elastic modulus at 25° C. of 1 GPa or more, the elastic modulus being measured at the protrusion center position in plan view by a nanoindentation method.

6. The cell culture scaffold according to claim 1, wherein the synthetic resin contains a Brønsted basic group in an amount of 0.2 mol % or more and 20 mol % or less in a constitutional unit.

7. The cell culture scaffold according to claim 1, wherein the protrusion has a water swelling rate of 50% or less.

8. The cell culture scaffold according to claim 1, wherein the protrusion has the peptide moiety on a surface thereof.

9. A cell culture container comprising the cell culture scaffold according to claim 1 in at least a part of a cell culture region.

10. The cell culture scaffold according to claim 1, wherein the linker moiety is formed by a linker, and the linker comprises a carboxylic acid having a polymerizable unsaturated group.

* * * * *